(12) United States Patent
Kossett (10) Patent No.: US 8,056,688 B2
(45) Date of Patent: Nov. 15, 2011

(54) IMMERSED WRAP SPRING DEVICE

(75) Inventor: John A. Kossett, Vadnais Heights, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 342 days.

(21) Appl. No.: 12/335,157

(22) Filed: Dec. 15, 2008

(65) Prior Publication Data

US 2009/0152072 A1 Jun. 18, 2009

Related U.S. Application Data

(60) Provisional application No. 61/007,760, filed on Dec. 14, 2007.

(51) Int. Cl.
*F16D 27/105* (2006.01)
*F16D 13/72* (2006.01)

(52) U.S. Cl. .................. 192/26; 192/84.81; 192/113.3; 192/113.34; 192/107 M; 417/319

(58) Field of Classification Search .................. None
See application file for complete search history.

(56) References Cited

U.S. PATENT DOCUMENTS

| 2,726,513 | A |   | 12/1955 | McWethy et al. |
| 4,566,579 | A | * | 1/1986 | Johnson ............... 192/113.34 |
| 4,828,089 | A | * | 5/1989 | Collins et al. ............. 192/70.12 |
| 6,080,075 | A | * | 6/2000 | Wussow et al. ............ 475/149 |
| 6,119,841 | A | * | 9/2000 | Orlamunder .............. 192/81 C |
| 2005/0014661 | A1 | * | 1/2005 | Sunkara ...................... 508/579 |
| 2007/0181399 | A1 |   | 8/2007 | Ackermann et al. |

FOREIGN PATENT DOCUMENTS

| EP | 1816368 | 8/2007 |
| FR | 1093465 | 5/1955 |
| GB | 1195439 | 6/1970 |
| GB | 1593165 | 7/1981 |
| WO | 2007108020 | 9/2007 |

OTHER PUBLICATIONS

PCT International Search Report for International Application No. PCT/US2008/086852 mailed on Mar. 19, 2009 (4 pages).
The Written Opinion of the International Searching Authority for International Application No. PCT/US2008/086852 mailed on Mar. 19, 2009 (6 pages).

* cited by examiner

*Primary Examiner* — David D Le
*Assistant Examiner* — Jacob S Scott
(74) *Attorney, Agent, or Firm* — Dicke, Billig & Czaja, PLLC (57) ABSTRACT

A wrap spring device includes a first hub and a second hub located axially to the first hub. A wrap spring is located externally and concentrically about the first and second hubs and glycol-based solution surrounds the spring. The spring is engaged and disengaged thereby causing the first and second hubs to engage and disengage each other.

19 Claims, 9 Drawing Sheets

IMMERSED WRAP SPRING DEVICE

CROSS-REFERENCE TO RELATED APPLICATIONS

This patent application claims priority under 35 U.S.C. §119(e) to U.S. Provisional Patent Application Ser. No. 61/007,760 entitled "IMMERSED WRAP SPRING DEVICE," having a filing date of Dec. 14, 2007, the contents of which are incorporated herein by reference.

BACKGROUND

The present invention relates to a wrap spring device, and in particular, a wrap spring device that is immersed in a water-based solution. Wrap spring devices allow variable connection between an input and an output with the control of the wrap spring. For example, the wrap spring can be controlled to alternatively allow it to wrap down onto input and output hubs and to allow it to wrap open off of the input or output hub.

In some designs, an oil or grease-based material is used in or around the wrap spring device to better dissipate heat and provide lubricity. However, some applications needing this additional cooling and lubricity cannot use these oil or grease-based materials. Furthermore, existing devices are not configured to operate properly in water or glycol-based liquids that could provide said cooling and lubricity. For these and other reasons, a need exists for the present invention.

SUMMARY

One embodiment provides a wrap spring device including a first hub and a second hub located axially to the first hub. A wrap spring is located externally and concentrically about the first and second hubs and a glycol-based solution surrounds the spring. The spring is engaged and disengaged thereby causing the first and second hubs to engage and disengage each other.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
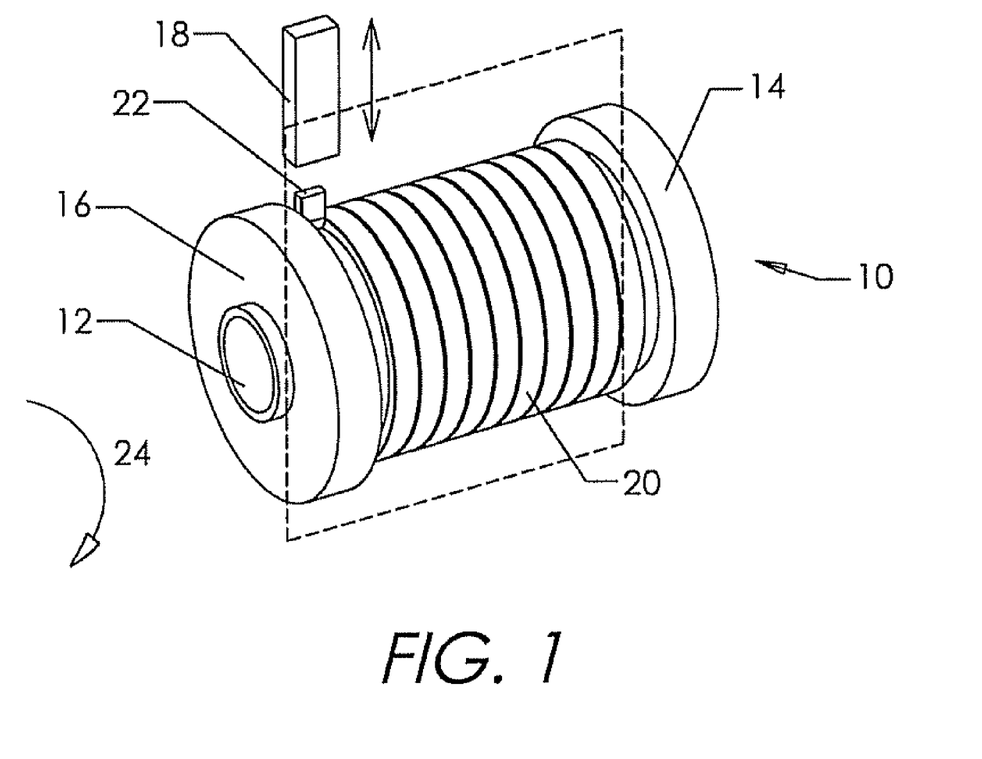
FIG. 1 illustrates a perspective view of one embodiment of a wrap spring device immersed in water.
Figure 2:
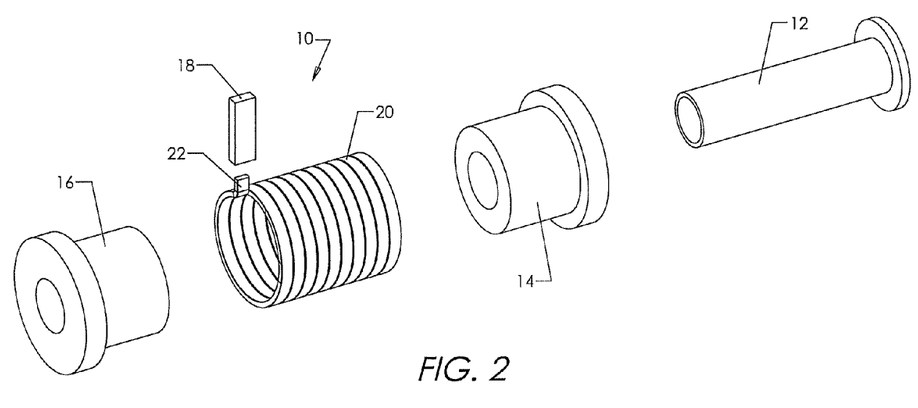
FIG. 2 illustrates an exploded view of the wrap spring device illustrated in FIG. 1.
Figure 3:
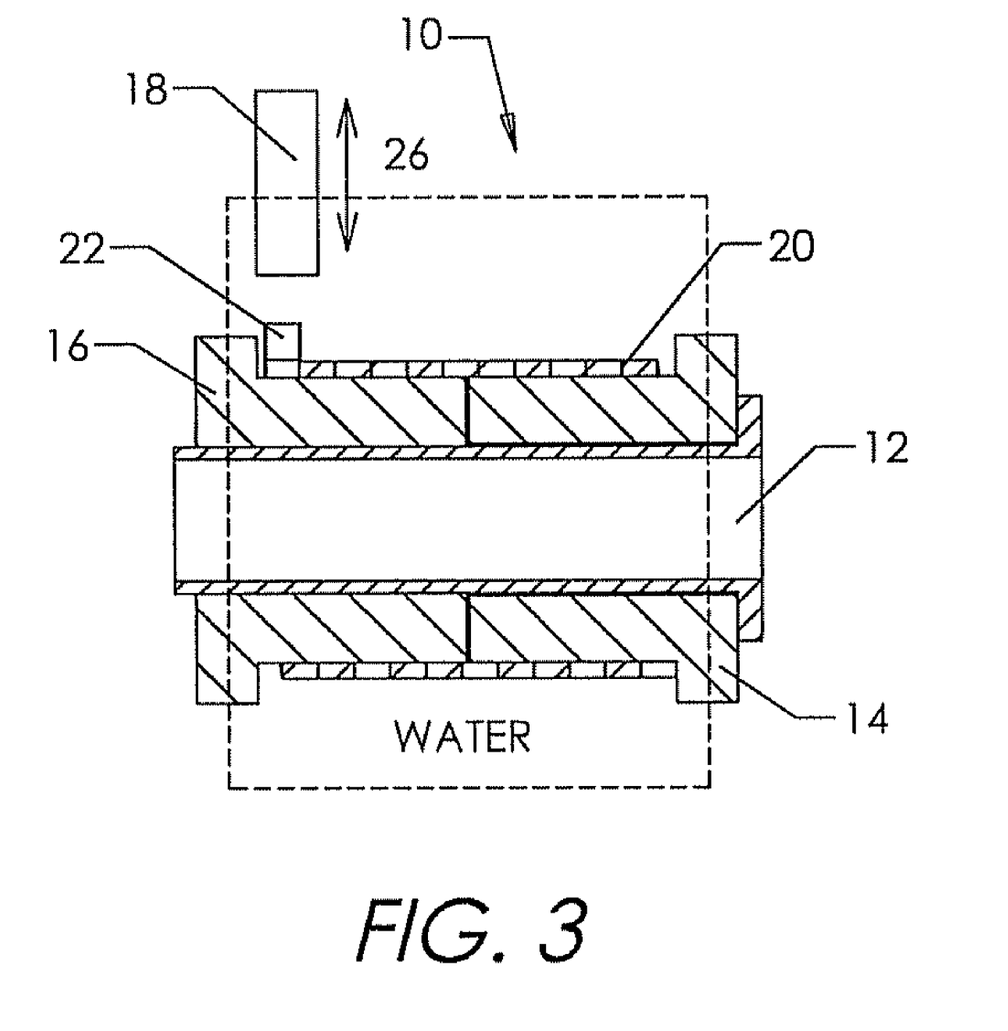
FIG. 3 illustrates a sectional view of the wrap spring device illustrated in FIG. 1.

FIGS. 1-3 respectively illustrate perspective, exploded and sectional views of wrap spring device 10 in accordance with one embodiment. These figures illustrate one embodiment of the invention. In FIGS. 1-3, wrap spring device 10 includes shaft 12, hub 14, collar 16, actuator 18 and wrap spring 20 with spring toe 22. In the figure, wrap spring device 10 is illustrated immersed in water outlined with a dashed line. Wrap spring device 10 allow variable connection between shaft 12 and hub 14 with the control of wrap spring 20, and it is configured to operate while fully immersed in water.

In one embodiment, hub 14 is free to rotate on shaft 12. Shaft 12 is pressed into collar 16 and holds collar 16 concentrically and axially located with respect to hub 14. Spring 20 is located concentrically with hub 14 and collar 16. When fully assembled, spring 16 has an interference fit with collar 16, and the interference fit can be achieved in a variety of ways.

When in an equilibrium state, spring 20 also has an interference fit with hub 14, which causes collar 16 to be solidly coupled to hub 14 the when collar 16 is driven in the clockwise direction (illustrated in FIG. 1 with arrow 24). Spring 20 can be wound in either a left-hand or a right hand configuration to provide for the desired input direction. As indicated with arrow 24, shaft 12 and collar 16 are configured to rotate in clockwise direction 24.

In one embodiment, actuator 18 can be moved in direction 26 toward and away from spring toe 22 on wrap spring 20. In one example, when actuator 18 is moved such that it engages spring toe 22 while collar 16 is driven in clockwise direction 24, wrap spring 20 will wrap off of collar 16. As such, wrap spring device 10 will be released when actuator 18 is moved into an interference position with spring toe 22 of wrap spring 20.

In one embodiment, the entire wrap spring device 10 is immersed in a glycol-based solution, such as an antifreeze and water mixture. This area that contains the water solution surrounding wrap spring device 10 is illustrated by a dashed line. The remaining components can be either partially or fully immersed in the water solution. In one embodiment, the glycol-based solution surrounding wrap spring device may include water and additives thereto. The water and additives can aid in the cooling and lubricating of wrap spring device while it operates.

Figure 4:
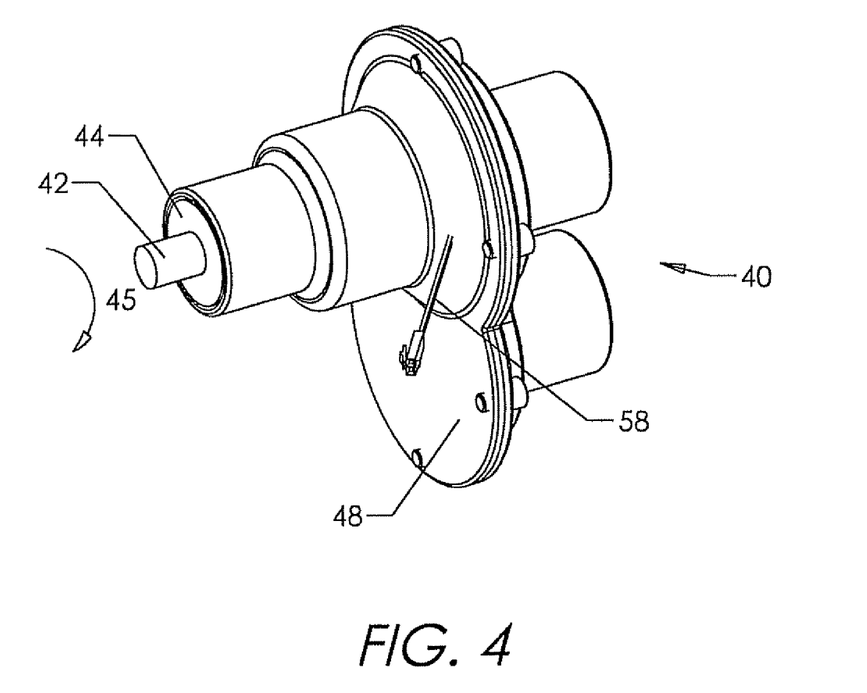
FIG. 4 illustrates a perspective view of another embodiment of a wrap spring device immersed in water.
Figure 5:
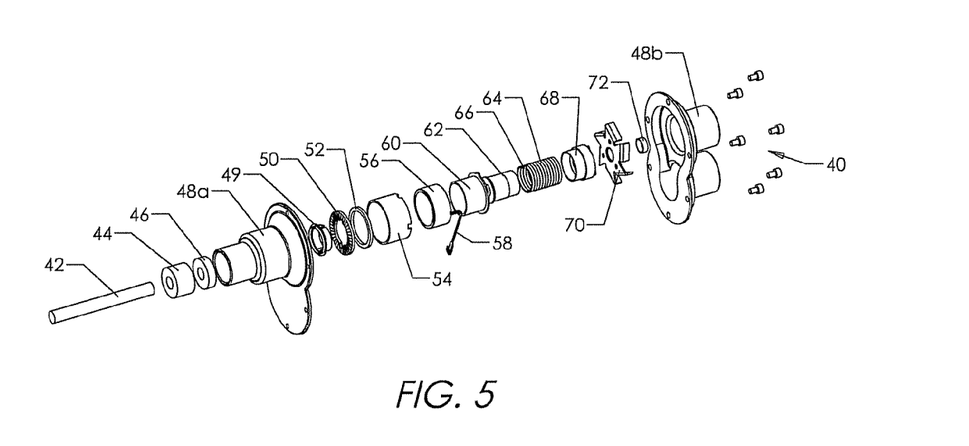
FIG. 5 illustrates an exploded view of the wrap spring device illustrated in FIG. 4.
Figure 6:
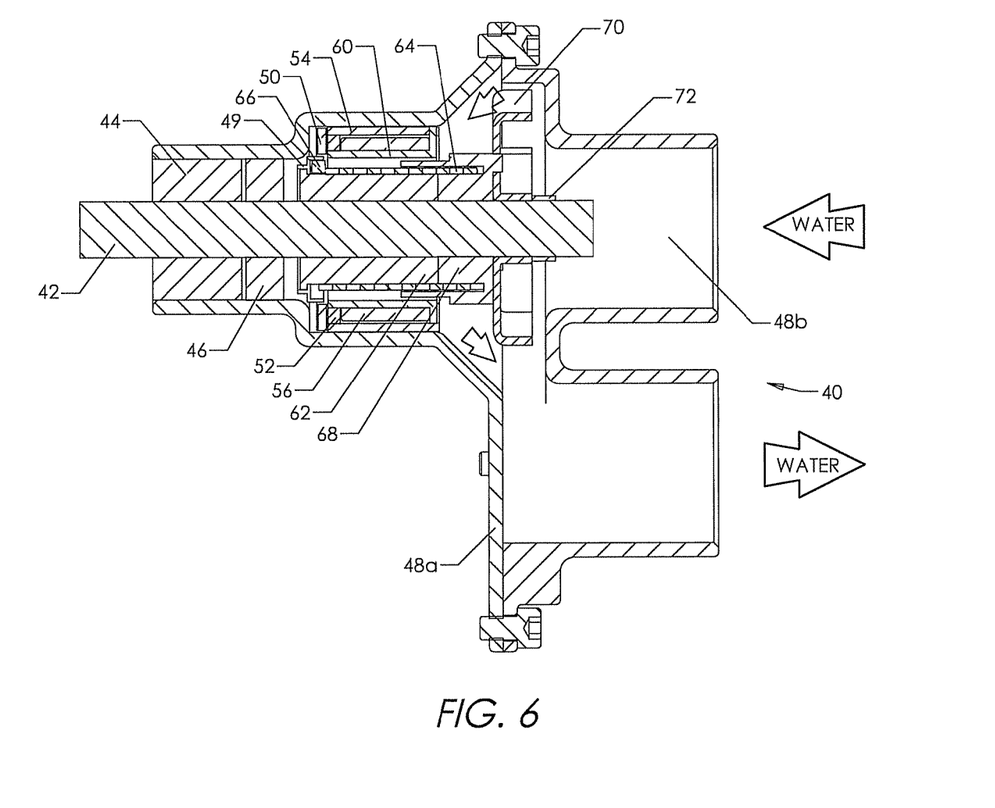
FIG. 6 illustrates a sectional view of the wrap spring device illustrated in FIG. 4.

FIG. 4-6 respectively illustrate perspective, exploded and sectional views of one embodiment of a wrap spring device 40. In this embodiment, wrap spring device 40 includes shaft 42, bearing 44, seal 46, housing 48 (including first and second halves 48a and 48b), control plate bushing 49, control plate 50, wear plate 52, case 54, coil 56, coil connector 58, tube 60, collar 62, spring 64, spring toe 66, hub 68, impeller 70, and retaining ring 72. When assembled, wrap spring device 40 allows variable connection between shaft 42 and hub 68 with the control of wrap spring 64, and it is configured to operate while fully immersed in a glycol-based solution.

In one embodiment, hub 68 and impeller 70 are free to turn on shaft 42. Collar 62 is press fit onto shaft 42. Spring 64 then spans collar 62 and hub 68, and spring 64 has an interference fit with hub 68. The interference fit between spring 64 and hub 68 can be achieved in a variety of ways. In one example, hub 68 is configured with a slot into which spring toe 66 of spring 64 is press fit. When in an equilibrium state, spring 64 also has an interference fit with collar 62, which causes collar 62 to be solidly coupled to hub 68 when control plate 50 is not engaged with wear plate 52.

When wrap spring 40 is fully assembled, control plate 50 is configured with a loose fit over spring 64 so that it can move axially. In one embodiment, control plate 50 has a notch configured to receive spring toe 66 so that it can support rotational torque. Control plate bushing 49 is configured to fit outside spring 64 and spring toe 66 and control plate 50 is configured to fit over control plate bushing 49.

Case 54, coil 56, tube 60 and wear plate 52 are all fixed to housing 48. Coil 56 creates an electromagnetic field that flows through case 54 and tube 60 and creates a magnetic force that will attract control plate 50 against wear plate 52 when coil 56 is energized. Wear plate 52 is non-magnetic and is used to create a larger wear surface to extend the life of the device.

When coil 56 is not powered, impeller 70 is coupled to shaft 42 by hub 68, spring 64 and collar 62. When coil 56 is powered, control plate 50 is held against wear plate 52 and this prevents the rotation of control plate 50. Since control plate 50 receives spring toe 66 in a notch, control plate 50 prevents spring toe 66 of spring 64 from rotating while control plate 50 is prevented from rotation while coil 56 is energized. This causes spring 64, hub 68 and impeller 70 to be decoupled from shaft 42.

In one embodiment, wrap spring device 40 is configured in a glycol-based solution or water-based solution. In one example, the glycol-based solution is a water and glycol solution within cooling system. The water solution may include any of a variety of a family of hydroxy ethers. As such, when impeller 70 is rotating it pumps or circulates the water/glycol solution throughout the cooling system while wrap spring device 40 is engaged, and then stops circulating the water/glycol solution when wrap spring device 40 is disengaged.

Housing 48 holds the components in the proper position and provides a container for the water/glycol mixture. In one case, housing 48 includes first and second halves 48a and 48b, which are bolted together with bolts or fasteners to form housing 48. The water/glycol mixture is able to freely flow around the components of wrap spring device 40, including spring 64, control plate bushing 49, and control plate 50. Bearing 44 supports shaft 42 and seal 46 prevents water from leaking out of housing 48. Retaining ring 72 holds impeller 70 and hub 68 in the proper axial position with respect to collar 62.

In one embodiment, the glycol-based or water-based solution surrounds all the components of wrap spring device 40 and is circulated throughout the system. In one example, the system is the cooling system of an automobile. In one embodiment, the water-based solution is a type of hydroxy ether, such as water/glycol mixture. For example, ethylene glycol or propylene glycol can be mixed in water. These types of additives to water can increase the effective boiling point ("colligative agents") of the solution and/or decrease the freezing point ("antifreeze agents") of the solution.

In addition, these additives to water can add lubrication to the system, which includes the various components of wrap spring device 40 that are contained within the water-based solution. As such, wear among the various interfering components of the wrap spring device can be decreased by the lubricious-material additives to the water. Also, where wrap spring device 40 changes suddenly from engaged to disengaged, that is, wrap spring 64 wraps open off of collar 62, or visa versa, that is, wrap spring 64 wraps down on collar 62, the surrounding water-based solution may help blunt the shock on the components, including wrap spring 64, especially where shaft 42 is normally rotating at high RPM.

Additional materials can be added to the water to inhibit corrosion within the system, which includes the various components of wrap spring device 40 that are contained within the water-based solution. These additives can be effective against corrosion, for example, where wrap spring device 40 has components that include a range of electrochemically incompatible metals such as aluminum, casecast iron, copper, steel and solder.

In one embodiment, the water-based solution is circulated through wrap spring device 40 as illustrated by the arrows in FIG. 6 (two within device 40 and two illustrating entry to and exit from device 40). When in operation, shaft 42 of wrap spring device 40 can rotate at very high RPM, for example, as high as 8,000 RPM. At these speeds, heat will be generated by the various parts of wrap spring device 40, and the circulation of the water-based solution can help move that heat out of wrap spring device 40. In addition, debris can be generated from the various parts of wrap spring device 40 interfering with each other over time. The circulation of the water-based solution through wrap spring device 40 can also help move the debris out if the device.

Figure 7:
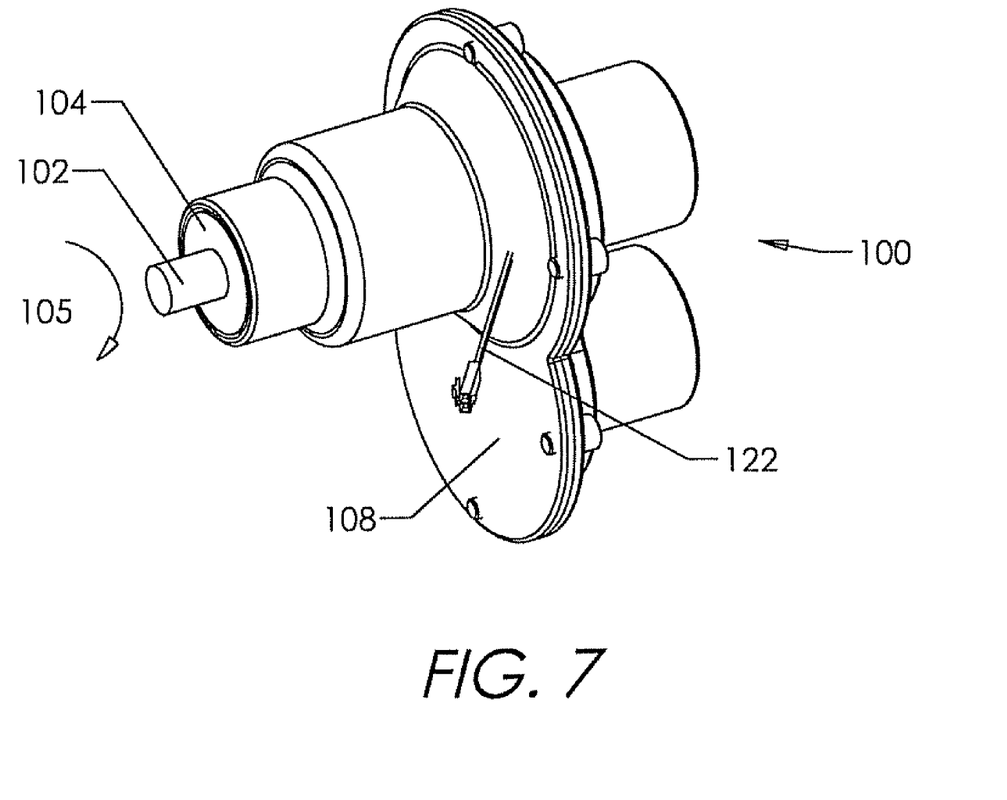
FIG. 7 illustrates a perspective view of another embodiment of a wrap spring device immersed in water.
Figure 8:
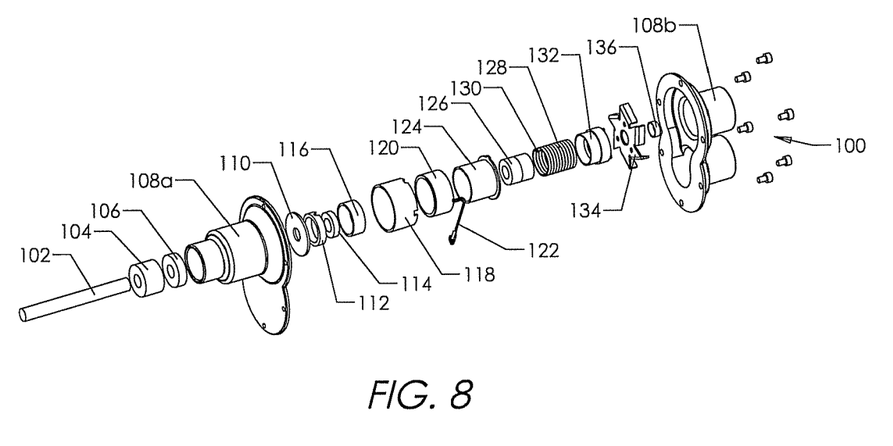
FIG. 8 illustrates an exploded view of the wrap spring device illustrated in FIG. 7.
Figure 9:
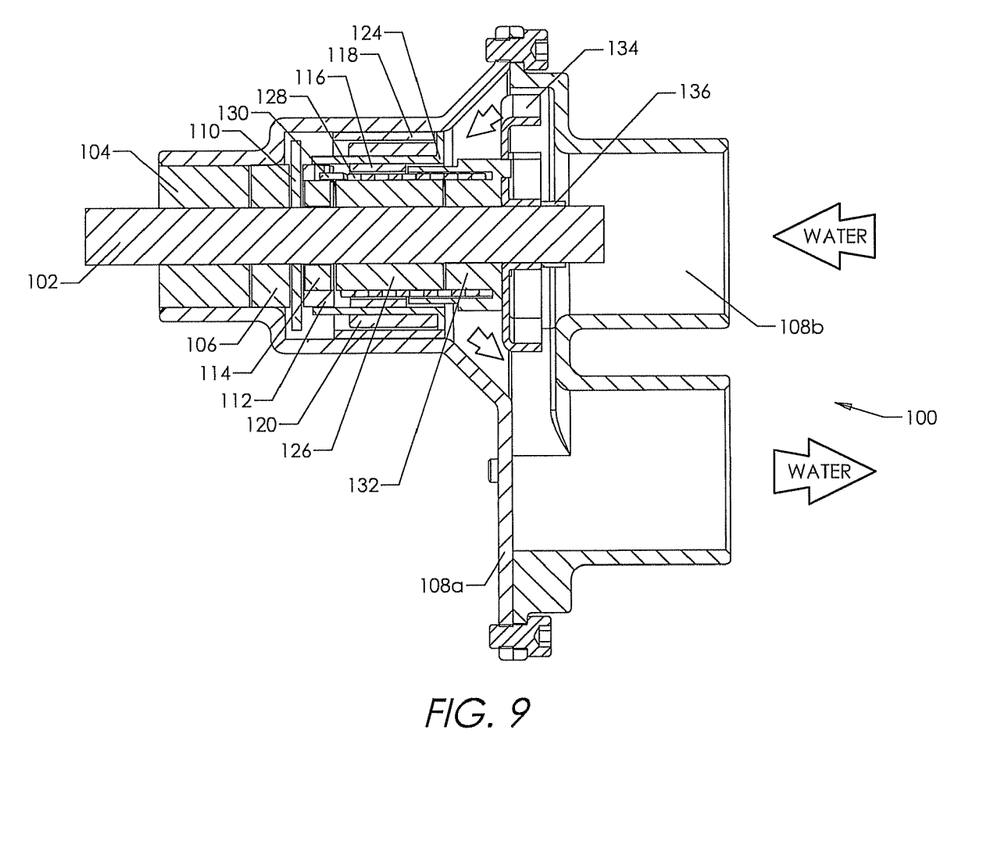
FIG. 9 illustrates a sectional view of the wrap spring device illustrated in FIG. 7.

FIGS. 7-9 respectively show perspective, exploded and sectional views of another embodiment of a wrap spring device 100. Wrap spring device 100 includes shaft 102, bearing 104, seal 106, housing 108, shoulder 110, control ring 112, ring bushing 114, brake collar 116, case 118, coil 120, coil connector 122, tube 124, collar 126, spring 128, spring toe 130, hub 132, impeller 134, and retaining ring 136.

Wrap spring device 100 illustrates a device that is similar to wrap spring device 40 illustrated in FIGS. 4-6. Wrap spring device 100, however, includes a spring 128 that has clearance with collar 126 and electrical power is used to engage the device. When assembled, just like wrap spring device 40, wrap spring device 100 allows variable connection between shaft 102 and hub 132 with the control of wrap spring 128, and it is configured to operate while fully immersed in a glycol-based solution.

Control ring 112 is located on ring bushing 114, which is a non magnetic bushing, and is free to rotate and move axially with respect to shaft 102. Spring 128 has an axial spring toe 130, which fits into a slot on control ring 112. Shoulder 110 is solidly connected to shaft 102. When power to coil 120 is off, control ring 112, spring 128, hub 132 and impeller 134 are free to rotate with respect to shaft 102. When coil 120 is energized, it creates an electromagnetic field that flows through case 108, tube 124, control ring 112 and shoulder 110, which creates a magnetic force that will attract control ring 112 to shoulder 110. This causes spring 128 to wrap down on collar 126, which couples hub 132 and impeller 134 to collar 126 and shaft 102.

Brake collar 116 is an optional part that can be used to provide a braking force when power to coil 120 is off. Spring 128 has an interference fit with brake collar 116 in the free state with power off. This prevents hub 132 and impeller 134 from rotating in one direction because spring 128 will expand and couple hub 132 to brake collar 116. This does not affect the engagement performance of this wrap spring device 100, because spring 128 can easily pull away from brake collar 116 when power is applied to coil 120.

In operation, wrap spring device 100 is also surrounded by a water-based solution that is circulated throughout the system as indicated with the arrows in FIG. 9 (two within device 100 and two illustrating entry to and exit from device 100). Wrap spring device 100 can also be configured in the cooling system of an automobile, and as above, water-based solutions can include a type of hydroxy ether, such as water/glycol mixture, ethylene glycol or propylene glycol. As above, these solutions can adjust freezing and boiling points, add lubrication, reduce wear, shock, and corrosion and remove heat and debris.

Although, the present invention has been described with reference to preferred embodiments, workers skilled in the art will recognize that changes may be made in form and detail without departing from the spirit and scope of the invention. One skilled in the art will recognize that various other applications for the wrap spring device are possible consistent with the invention.

What is claimed is:

1. A wrap spring device comprising:
    a first hub;
    a second hub located axially to the first hub;
    a wrap spring located externally and concentrically about the first and second hubs;
    a glycol-based solution surrounding the spring;
    a housing containing the first and second hubs, and the wrap spring, the housing configured such that the glycol-based solution flows in and out of the housing;
    an impeller within the housing and coupled to one of the first and second hubs such that the impeller forces the glycol-based solution through the housing; and
    means for engaging and disengaging the spring thereby causing the first and second hubs to engage and disengage each other.

2. The wrap spring device of claim 1, wherein the wrap spring has a first and second end, and wherein the first end of the wrap spring is fixed to the first hub and the second end of the wrap spring is configured to be alternately engaged and disengaged thereby causing the first and second hubs to engage and disengage.

3. The device of claim 2 further comprising:
    a plate coupled to the second end of the wrap spring; and
    an electromagnetic coil adjacent the plate;
    wherein energizing the electromagnetic coil magnetically attracts the plate causing the wrap spring to engage the second hub such that the first and second hubs are engaged and rotate together.

4. The device of claim 3, wherein de-energizing the electromagnetic coil releases the plate causing the wrap spring to release the second hub such that the first and second hubs are released and rotate independently.

5. The wrap spring device of claim 1, wherein the glycol-based solution includes water and a rust preventative additive.

6. The wrap spring device of claim 1, wherein the glycol-based solution includes an antifreeze additive.

7. The wrap spring device of claim 1, wherein the glycol-based solution includes a hydroxy ether additive.

8. The wrap spring device of claim 7, wherein the hydroxy ether is one of ethylene glycol and propylene glycol.

9. The wrap spring device of claim 1, wherein the glycol-based solution includes water and the wrap spring, and hubs are comprised of one of a group of metals comprising aluminum, cast iron, copper, steel and solder.

10. A system comprising:
    a housing;
    a first hub contained within the housing;
    a second hub located axially to the first hub and contained within the housing;
    a wrap spring located externally and concentrically about the first and second hubs;
    water within the housing and surrounding the spring, the housing being configured such that the water flows in and out of the housing;
    an impeller within the housing and coupled to one of the first and second hubs such that the impeller forces the water through the housing; and
    means for engaging and disengaging the spring thereby causing the first and second hubs to engage and disengage.

11. The system of claim 10, wherein the wrap spring has a first and second end, and wherein the first end of the wrap spring is fixed to the first hub and the second end of the wrap spring is configured to alternately wrap down onto and wrap open off of the second hub, thereby causing the first and second hubs to alternately engage and disengage.

12. The system of claim 10, wherein the water includes a hydroxy ether additive.

13. The system of claim 12, wherein the hydroxy ether is one of ethylene glycol and propylene glycol.

14. The system of claim 10 configured as a cooling system in an automobile.

15. A wrap spring device comprising:
    a first hub;
    a second hub located axially to the first hub;
    a wrap spring located externally and concentrically about the first and second hubs;
    an antifreeze solution surrounding the spring;
    a housing containing the first and second hubs, and the wrap spring, the housing configured such that the antifreeze solution flows in and out of the housing;
    an impeller within the housing and coupled to one of the first and second hubs such that the impeller forces the anti-freeze solution through the housing; and
    means for engaging and disengaging the spring thereby causing the first and second hubs to engage and disengage each other.

16. The wrap spring device of claim 15, wherein the wrap spring has a first and second end, and wherein the first end of the wrap spring is fixed to the first hub and the second end of the wrap spring is configured to be alternately engaged and disengaged thereby causing the first and second hubs to engage and disengage.

17. The wrap spring device of claim 15, wherein the antifreeze solution includes a rust preventative additive.

18. The wrap spring device of claim 15, wherein the antifreeze solution includes a hydroxy ether additive.

19. The wrap spring device of claim 18, wherein the hydroxy ether is one of ethylene glycol and propylene glycol.

* * * * *